United States Patent

Brewington

[15] 3,697,674

[45] Oct. 10, 1972

[54] INTERMITTENT PROBLEM ALARM FOR ELECTRONIC EQUIPMENT BASED ON A CRT IMAGE

[72] Inventor: Doyle W. Brewington, Omaha, Nebr.

[73] Assignee: V. F. Ward, Omaha, Nebr.

[22] Filed: Sept. 4, 1970

[21] Appl. No.: 69,652

[52] U.S. Cl.....178/5.4 TE, 178/DIG. 4, 250/217 CR, 315/10, 324/20 CR, 340/421

[51] Int. Cl.............................H04n 5/58, H04n 9/16

[58] Field of Search.....178/5.4 TE, DIG. 4, DIG. 33, 178/DIG. 1, DIG. 37, DIG. 38; 340/201 P, 421; 250/217 CR; 324/96, 20 CR; 315/22, 10

[56] References Cited

UNITED STATES PATENTS

| | | | |
|---|---|---|---|
| 2,553,729 | 5/1951 | St. Marie | 178/7.8 X |
| 3,536,831 | 10/1970 | Kanemaki et al. | 178/DIG. 33 |
| 3,462,229 | 8/1969 | Wicker | 356/169 |
| 2,731,597 | 1/1956 | Schade | 324/20 CR |
| 3,189,780 | 6/1965 | Takagi et al | 315/10 |
| 3,309,459 | 3/1967 | Donigian | 178/5.4 TE |
| 3,401,331 | 9/1968 | Mussulman | 178/DIG. 4 |

*Primary Examiner*—Robert L. Richardson
*Attorney*—Arthur Schwartz

[57] ABSTRACT

A device for testing for the presence of intermittent problems in electronic equipment having a cathode ray tube image. The device includes a cadmium sulfide cell placed adjacent the screen of a cathode ray tube for an indefinite period of time. Upon the occurrence of a deviation from the set standard an alarm will be actuated.

23 Claims, 4 Drawing Figures

INVENTOR
DOYLE W. BREWINGTON

BY Arthur Schwartz
ATTORNEY

INVENTOR
DOYLE W. BREWINGTON

BY *Arthur Schwartz*

ATTORNEY

INTERMITTENT PROBLEM ALARM FOR ELECTRONIC EQUIPMENT BASED ON A CRT IMAGE

BACKGROUND AND OBJECTS OF THE INVENTION

The invention relates to a device for testing intermittent problems which occur in electronic equipment and can be ascertained from the image on the screen of a cathode ray tube.

More particularly, the invention deals with an aid for personnel who service or test television sets and the like.

It has been estimated that intermittent problems require approximately 40 percent of a technician's time as he attempts to locate the problems in an ordinary television receiver. This is because of the fact that many hours are consumed in waiting for a problem to develop which occurs only intermittently or only after a certain period of time. Also there is additional time wasted trying to cause the problem to develop, all in order to remedy the situation. Therefore, it is desired to have a testing device which will notify the technician or repair man when the problem occurs. In this manner, he can devote his time in the interim to other work, and the customer is not charged for non-productive time.

The prior art contains various types of units which have utilized devices physically connected to the set. However, these are usually effective only when the technician knows exactly what the problem is. Such units are expensive and are not at all versatile since they require prior knowledge as to the problem. Also, with these devices, it is normally necessary to take the television set completely apart; whereas, often only a new tube is required. For example, an intermittent problem often occurs when there is a grid leak which develops only after the tube heats up. Once the grid leak occurs, the tube cools somewhat, and the problem disappears. Therefore, the problem can recur over and over again. In this instance it would not be necessary to take the entire set apart, but merely ascertain what the problem is from the pattern or color change on the screen, and then from past experience one skilled in the art ordinarily knows what causes the problem and can remedy it.

Therefore, it is an object of the instant invention to provide a device which may be positioned adjacent the screen of the cathode ray tube, sense the problem when it occurs, and give an indication thereof. This is done without any disturbance to the set per se.

One prior art reference which illustrates a device that must be attached to the set is U.S. Pat. No. 3,309,459. This reference utilizes a photosensitive device in front of the TV screen; however, it is not a detecting instrument but is a servicing instrument which is obviously much more complex and is completely attached to the internal portions of the television set.

U.S. Pat. No. 3,401,331 illustrates a device which is not attached to the set, but is merely an electronic means used to detect convergence in a color television cathode ray tube. Other references such as U.S. Pat. Nos. 3,008,001 and 3,369,201 illustrate, respectively (1) a device which has photosensitive means positioned adjacent the television screen, and (2) a color cathode ray tube convergence and deflection testing assembly used in the manufacture of picture tubes.

It is another object of the instant invention to have a device which is merely positioned adjacent the screen of a cathode ray tube, set for a specific sensitivity and left in place. The technician then returns to his other work. When the intermittent problem occurs, an alarm notifies him.

It is also an object to provide a device which will photograph the screen at the time the problem occurs. This feature of the invention can be used when the technician is not in the area at the time the alarm is sounded. The picture may also be used in conjunction with a file as a comparative source for similar problems occurring in the future. In other words, it will be known from cumulative past experience that when a particular phenomenon occurs on the screen, a given problem has resulted or a given element in the set is defective.

It is further contemplated that the invention can be utilized in a factory wherein sets being tested for quality control each have a test unit associated therewith; in hospitals for radioscope control; and also for control of oscilloscopes. In the instant device, the technician generates a given pattern on the screen so that it can be tested with a high degree of sensitivity. This is opposed to the use of normal television transmission which can vary due to causes outside of the confines of the set itself, for example, atmospheric conditions.

While the invention is not limited to use with color television sets, it has a unique adaptability to both color and black and white tubes. This is because the photosensitive means is cadmium sulfide which is sensitive to green.

SUMMARY OF THE INVENTION

The invention includes a device which is positioned for an indefinite period of time in front of the screen of a cathode ray tube. A particular pattern is generated on the screen of the tube. A photosensitive element, specifically a cadmium sulfide cell, is positioned by means of a light shade adjacent a portion of the screen. A plurality of batteries provide a power source for an alarm as well as for the photosensitive cell. The bias on the cell is adjusted by means of a potentiometer so that a given color or contrast is tested for.

Upon the occurrence of a vertical, horizontal or other kind of deviation or variance from the pattern, an alarm will sound. Also, the alarm will sound if the contrast or color changes from the predetermined set value, the value being set by the potentiometer. When the alarm sounds, the technician will know that a problem occurs.

It is also contemplated that the device have included therewith a camera to photograph the variance.

The invention takes the form of a small, compact series of modular units connected together comprising (1) a cell module to house the photosensitive means, (2) a gating module for initiating the alarm, (3) an alarm module with a horn therein, (4) a power module for housing batteries, and (5) a control module for varying the sensitivity of the cell.

DETAILED DESCRIPTION OF THE INVENTION

The invention can best be described by an examination of the 1. CIRCUITRY, 2. MODULE ASSEMBLY, 3. SUPPORT, and 4. CONVERGENCE ATTACHMENT.

1. CIRCUITRY

Figure 1:
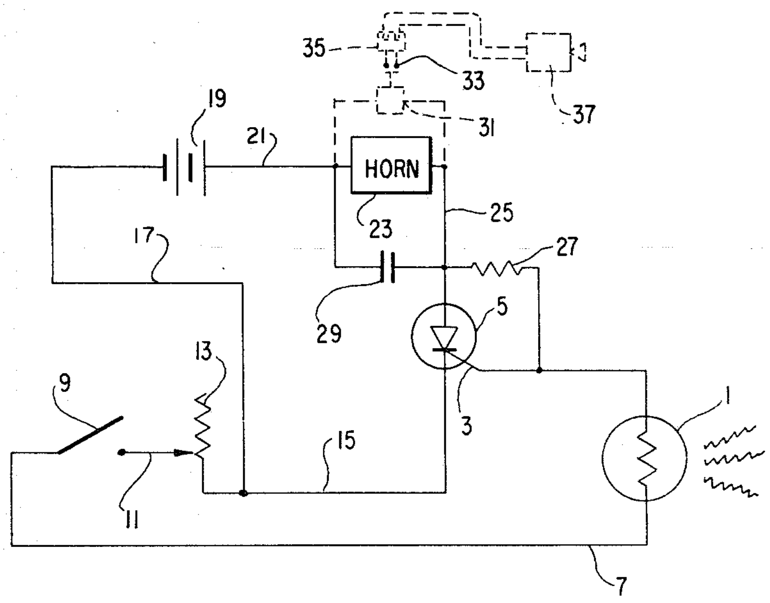
FIG. 1 is a schematic of the circuit in the instant invention.

The circuit of the invention which is contained in the MODULE ASSEMBLY is illustrated in FIG. 1. The positive side of a light or photosensitive element in the form of a cadmium sulfide cell 1 is connected to a gate 3 of a silicon-controlled rectifier (SCR) 5. The negative side of the cell 1 is connected by a line 7 to an on-off switch 9 which is associated with a movable leg 11 of a variable resistance or potentiometer 13. The cathode of the SCR 5 is connected via line 15 to the stationary side of the potentiometer 13. The cathode is also connected via line 17 to one or more mercury cell type batteries 19. The positive side of the batteries 19 is connected through line 21 to an alarm or horn 23. The anode of the SCR 5 is connected via line 25 to the other side of the alarm.

The circuit is balanced by a 4.7 K resistance 27 in conjunction with the potentiometer 13 which is in the order of 93.5 K. A capacitor 29 is connected in parallel across the alarm 23.

A relay 31 may be connected in parallel with the alarm 23 which will actuate a switch to bridge a pair of contacts 33 connected to a plug 35. The plug 35 may have associated with it a camera 37. This camera is preferably of the self-developing type wherein a picture can be obtained in a very short amount of time.

As will be readily seen from the operation of the entire unit discussed below, the switch 9 can be closed and the potentiometer 13 adjusted to a desired bias level on the cadmium sulfide cell 1. This will make the cell 1 extremely sensitive to a change in a specific color or deviation from a set pattern. When the predetermined level is deviated from, the current flowing through the gate 3 of the SCR 5 will be sufficient to gate on the SCR and provide a current flow from the battery 19 to the alarm 23 through lines 15, 17, 21 and 25.

If it is desired to photograph the screen at this particular instant of deviation, a camera 37 may be plugged into the unit so that relay 31 will be actuated simultaneously as the alarm is sounded. The circuit across contacts 33 will be closed and the camera will be energized. Since the camera has its own power supply, it is not necessary to furnish power from the unit to actuate the camera. As will be obvious, the camera may be substituted for the alarm entirely, or means other than the relay may be used to actuate the camera.

2. MODULE ASSEMBLY

The invention is composed of five interfitting modules which are designated as A – E. The reference numerals of FIG. 1 will be used in the discussion of the various modules wherever possible.

MODULE A. Module A, or the cell module, consists of a tunnel shaped light shade 101 which is placed against the TV screen. It is designed so that it will pick up 80 dots per square inch, and has a 1 × 25 power magnifying lens 103 therein to build up the dot formations and project them onto the cadmium sulfide cell 1. The cell is connected in a known manner to a screw or twist type plug 107. A plurality of threads or the like 109 are connected to the negative side of the cell, and a bulb type projection 111 is connected to the positive side of the cell.

The light shade is utilized so that there will be no ambient light interfering with the unit. It is best to use the unit in a darkened condition; however, it can be used with the shade in a lighted environment.

The Module A as indicated above screws into the Module B.

MODULE B. The Module B, or gating module, includes a female receptacle 113 which has means schematically illustrated at 115 connected thereto to pick up the negative side of the cadmium sulfide cell 1 through the threads 109. The bulb 111 in Module A contacts a base contact 117 in the female socket.

Any number of types of sockets may be used, for example, a plug-in-type, a bayonet twist-on type or a screw type as is used in flashlight bulb connections.

The Module B includes the SCR 5, wherein the gate 3 is connected to the positive contact 117. The balancing resistance 27 is connected across the gate circuit to a female plug 119. The cathode of the SCR is connected via line 15 to the plug 119, as is the anode via line 25. The negative side of the cell 1 is connected to the plug through contact 115 via line 5.

All of the wires, as well as the resistor and SCR, can be molded or "potted" within Module B. In this manner, the unit will not be subject to breakage as easily as if a potted arrangement were not used. The plug 119 as well as the other plugs discussed hereafter are of the commonly used "Jones Plug" type.

Since there are four pins or receptacles on each plug they have been arbitrarily designated from the bottom up as A, B, C, D. As will be apparent, line 7 is connected to pin A, line 15 is connected to pin B, line 25 is connected to pin C, and the resistance 27 is connected to pin D.

MODULE C. Module C, or alarm module, is similar to Module B in that it includes a plug 121 of the male type to cooperate with plug 119, as well as another male plug 123 to cooperate with the Module D. Again, each of the pins and receptacle elements are designated as A – D. Further, the various elements are potted within the module.

Module C, which is circular in cross-section, as are the remainder of the modules, has an annular projecting flange 124 which cooperates with the recess 120 in Module B when plugs 119 and 121 are connected.

For the reasons set out below there are a number of louvers 125 in Module C. The louvers cooperate with the alarm 23. Also included in the Module C is the capacitor 29 and the optional relay 31.

Line 7 connects from pin A in plugs 119 and 121 through Module C to pin A of plug 123. Line 15 also continues through Module C from pins B to B. Line 25 connects from the anode of the SCR to pin C, and from pin C to the capacitor 29 and to one side of the alarm 23. The other side of the alarm 23 connects via line 21 to pin C of the plug 123.

The relay 31 is optionally placed in parallel across the alarm 23 and capacitor 29. It has a contact bridging contacts 33 which in turn is connected to plug 35 for use with camera 37.

Pin D of plug 123 is not used.

As will be apparent, the louvers allow the sound to emanate from the alarm 23. Module C also has recesses 120 similar to those in Module B.

MODULE D. Module D, or power module, is not potted as are the previous two modules, it being in the form of a hollow cylinder which will accommodate the batteries 19. There may be either two or four batteries connected in series or parallel, depending on the power and life desired. They are mercury cell type for long life. It has been found that an arrangement which produces 5.6 volts is adequate for the instant purposes.

One end of the Module D which has the flanges 124 has a plug 127. Line 7 extends from pin A through Module D to pin A of a plug 129 at the other end thereof. Line 15 likewise extends from pin B through to pin B of plugs 127 and 129, respectively. The batteries are connected by means of a plate 131 at one end thereof and a plate 133 at the other end thereof.

Line 21 from the capacitor in Module C, as well as from the alarm and relay, extends to pin C in Module D and attaches to the plate 131. Pin D is not used in this connection.

The Module D has a removable end; therefore, the batteries are accessible and it is possible to change batteries when they fall below a given power level. Since they are mercury cell batteries, they may be recharged.

It has been found that the device will function and maintain a constant steady picture analysis for 12 hours without losing any power. It has also been tested and found that the device will alarm for three full hours without overly draining the battery power.

MODULE E. Module E, or control module, includes the potentiometer 13 and switch 9. The lines 7 and 15 extend from plug 129 to plug 135 through pins A and B, respectively. In the type of potentiometer utilized, the negative side of the batteries is connected through pins C and D in the respective plugs to both the potentiometer and switch. In this type of well-known device it is possible to turn off the potentiometer-switch combination without adjusting the resistance therein. A knob 137 operates the movable contact 11 on the potentiometer in a well-known manner. Again, Module E may be potted in the manner explained above. This module is placed in the rear so that once the lens is in place, it need not be disturbed.

The entire module assembly is designed to be 2 inch in diameter and 6½ inch in length.

3. SUPPORT

Figure 3:
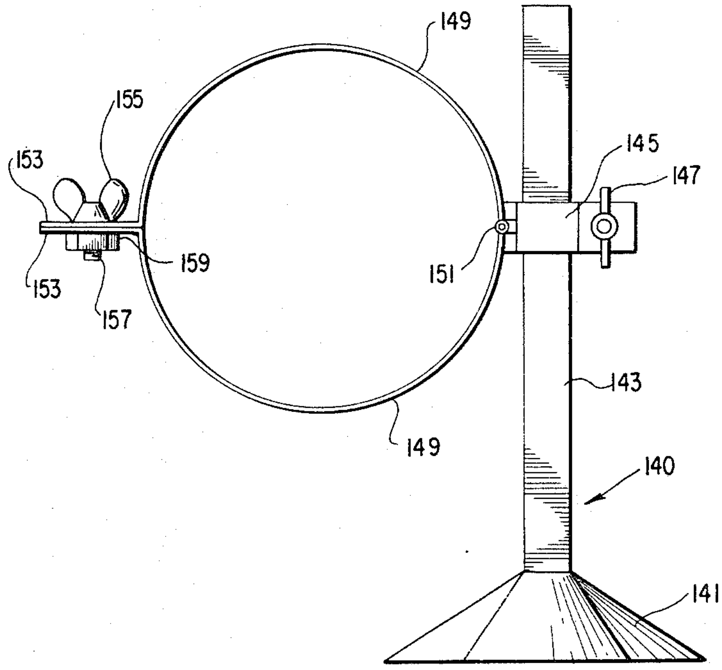
FIG. 3 is a view of the support for the device of the invention.

FIG. 3 illustrates a support 140 having a base 141 in the form of a pyramid 9 inches × 9 inches × ½ inch and a vertical aluminum shaft 143 ¾ inches × ¾ inches and 20 inches high. A slidable bracket 145 is adjustably positioned along the shaft 143 by means of a butterfly wing nut 147. Attached to the bracket 145 are a pair of pivoting arms 149 which pivot around a point 151. Each of the arms 149 has an extending flange 153 which is joined by a wing nut 155 having a shaft 157 and a nut 159. Arms 149 may also be in the form of an enlarged plastic 0-ring.

Figure 2:
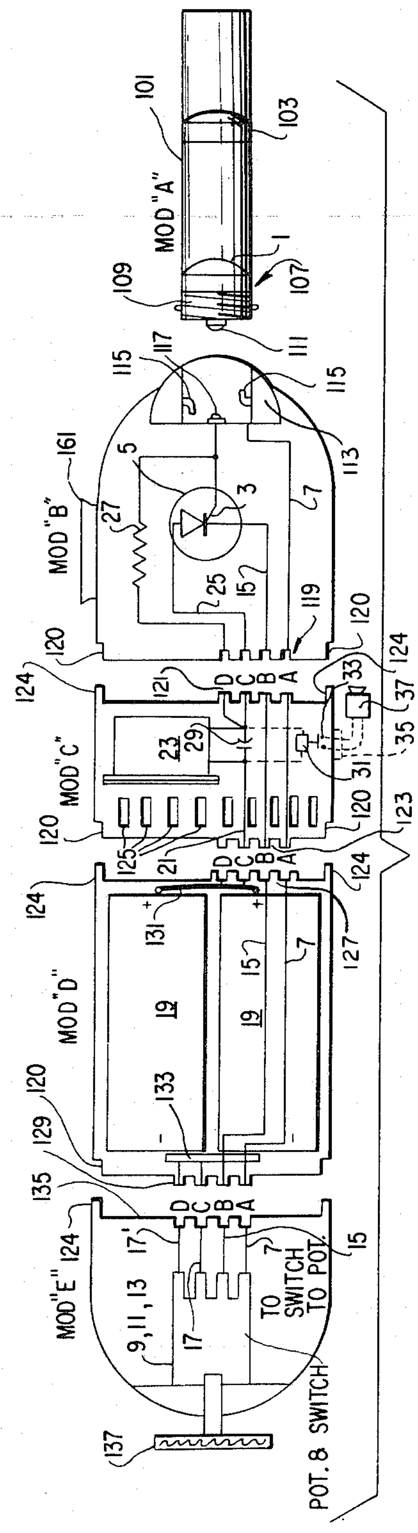
FIG. 2 is an exploded view of the invention in schematic form.

As will be seen in the overall operation below, the module of FIG. 2 is inserted in the opening created by the arms 149 and adjusted in place.

4. CONVERGENCE ATTACHMENT

Figure 4:
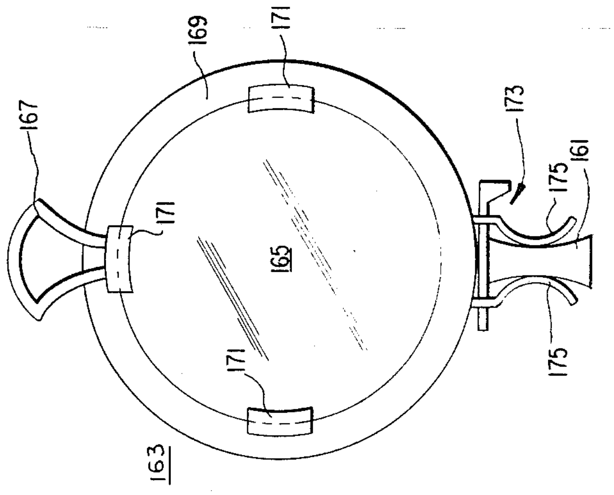
FIG. 4 is a schematic view of a converging lens attachment.

With reference to FIGS. 2 and 4 it will be seen that an I-beam type rail 161 is positioned on top of Module B.

Slidably positioned on the I-beam rail is a convergence aid 163 which includes a lens 165. The unit has a finger bar 167 along the top for moving the lens which is clamped in a ring 169 by means of suitable clamping means 171. A pressure bar is indicated generally at 173 and includes a pair of pressure arms 175 which frictionally hold the aid on the I-beam rail 161. The convergence aid is utilized by the technician in checking the dot pattern to see that the colors are converging properly. This will show in what manner the various colored dots overlap so that the technician can properly center them. The finger bar 167 is merely used to push the aid back and forth on a sliding rail for adjustment to the eyesight of the individual using it or to reflect the resulting image on a mirror positioned behind the aid.

OPERATION OF THE DEVICE

The assembled module unit having the various Modules A – E connected together is inserted in the support 140 in the manner described above by placing it between the arms 149 and securely locking it in place. The base 141 is then moved to a desired location relative to the screen, and the bracket 145 is raised or lowered by means of the wing nut 147 to locate the light shade and hence the entire device adjacent the exact location on the screen which is to be tested.

A particular pattern is generated on the screen since atmospheric conditions can cause variances in commercial TV reception. The pattern of any particular shape on a black and white screen or a particular color or spectrum of colors on a color television screen may be generated. Regardless of the type of unit that is being tested, the intensity of the screen is adjusted downwardly to where the line or pattern is finite or definite. Obviously, when the pattern or line is quite definite, the sensitivity control may be set at its most sensitive point. If it is not a definite line, the most sensitive point may not be located. Therefore, the pattern from a contrast standpoint is cut to a definite point. On the other hand, the point may be located at the peak contrast.

By means of the knob 137 the potentiometer 13 is adjusted thus controlling the bias on the cadmium sulfide cell 1. Assuming that one is desiring to locate an intermittent problem on a color screen, the first approach may well be to examine the green scale. Therefore, all of the other guns are shut off and the green gun is left on. When green disappears it will turn to black, and the unit will detect the loss at that point. Therefore, if only green were being tested and it went off, the bias would be such on the cadmium sulfide cell 1 that the SCR 5 would gate on and the alarm 23 would sound. At that time the technician would act while the alarm condition is in effect to correct the problem.

Likewise, if one were checking for blue or red and if there is a change in hue, the change in hue will cause the device to emit an alarm signal.

If one were examining a color set with all three colors on at once, the color bar on the screen would be adjusted to a color such as skin color. The potentiometer switch unit would be initiated and the resistance adjusted until the alarm sounded. The potentiometer would then be "backed off" so that the alarm went off. When the color changed, it would again alarm. If one were dealing with black and white and it was desired to test for a contrast change, it would be possible with the instant device to examine a single dot or two. Again, for example, if a color gun check is desired, the device may examine a single color dot.

The device is also so constructed, being made out of Teflon or a rubberized material, as well as appropriately potted and sealed, that when one portion of the device fails, it is merely necessary to replace that particular module. It is not necessary to replace the entire device or go into any time consuming activity in checking for the specific error. Since the devices are relatively inexpensive, it is possible to have a considerable number of these in one shop.

I claim:

1. A device for use in testing a CRT image comprising:

a. a single photosensitive means adapted to be positioned in front of and adjacent to the screen of a CRT, b. means connected to said photosensitive means for providing an indication when the image on the CRT screen deviates from a given pattern, and c. means for varying the light sensitivity of said photosensitive means.

2. A device as defined in claim 1 wherein said indication means is an audible alarm.

3. A device as defined in claim 1 wherein said indication means is a photographic picture.

4. A device as defined in claim 1 including means for gating on said indication means.

5. A device as defined in claim 4 wherein said gating means is a silicon-controlled rectifier.

6. A device as defined in claim 4 wherein said varying means is a variable resistor.

7. A device as defined in claim 1 wherein said photosensitive means is sensitive to the color "green."

8. A device as defined in claim 1 wherein said photosensitive means is a cadmium sulfide cell.

9. A device as defined in claim 1 wherein said device includes a plurality of interlocking modules.

10. A device as defined in claim 9 wherein said modules have corresponding male and female plug members for facilitating said interlocking arrangement.

11. A device as defined in claim 1 including a support means, means on said support for holding the device, and means for varying the location of the device relative to the CRT screen.

12. A device as defined in claim 1 including casing, a rail mounted on said casing, and a lens movably mounted on said rail.

13. A device as defined in claim 1 including a means for shielding light positioned between said photosensitive means and the CRT screen.

14. A device as defined in claim 13 including a magnifying lens in said shielding means.

15. A device for use in testing a CRT image comprising:

a. a single photosensitive means, b. means for varying the sensitivity of said photosensitive means, c. a silicon-controlled rectifier, d. an alarm in series with said silicon-controlled rectifier.

e. said photosensitive means and said varying means being in series with the gate of said silicon-controlled rectifier and f. a power source in series with said alarm and said photosensitive means.

16. An alarm circuit as defined in claim 15 including switch means in parallel with said alarm, said switch means being connected to a camera.

17. A device as defined in claim 16 wherein said alarm is an audible alarm.

18. A device as defined in claim 1 wherein said device includes a convergence aid comprising:

a. a support positionable relative to the screen of the tube and mounted on said testing device, b. a lens for viewing the convergence of dots on the screen, and c. means to slidably position said lens relative to said support and the screen.

19. A device for testing for the presence of intermittent problems in electronic equipment based on a CRT image appearing on a screen comprising:

a. means for establishing a finite image on said screen, b. means for placing a single light sensitive element adjacent a given area of said screen, and c. means for signaling when said image deviates from an accepted value, and d. means for varying the sensitivity of said light sensitive element.

20. A device as defined in claim 19 including means for varying the sensitivity to a given color of said light sensitive element.

21. A method of testing for the presence of intermittent problems in electronic equipment based on a CRT image appearing on a screen comprising:

a. generating an image on the screen, b. positioning a variable sensitive testing device for an indefinite period of time adjacent the screen, at a point of suspected fault, c. receiving a portion of the image on a photosensitive element, and d. indicating any deviation of the image from a preselected standard.

22. A method as defined in claim 21 including magnifying the portion of the image.

23. A method as defined in claim 21 including photographing the deviation.

* * * * *